THOMAS R. ALLEN, OF SYRACUSE, NEW YORK.

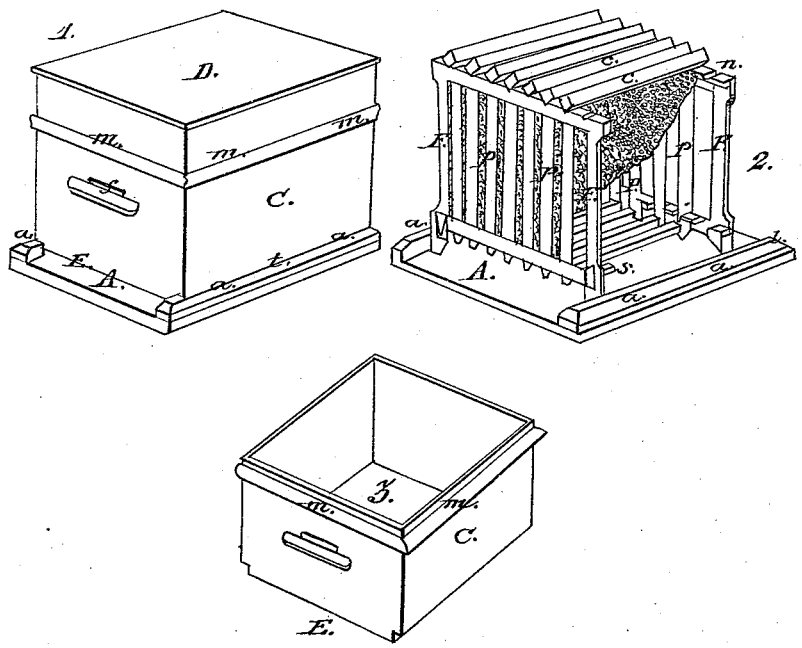

Letters Patent No. 84,788, dated December 8, 1868.

IMPROVEMENT IN BEE-HIVES.

The Schedule referred to in these Letters Patent and making part of the same.

*To all whom it may concern:*

Be it known that I, THOMAS R. ALLEN, of the city of Syracuse, Onondaga county, New York, have invented a new and improved Bee-Hive; and I do hereby declare that the following is a full, clear, and exact description of the construction of the same, and the form thereof, when complete and ready for use, reference being had to the annexed drawings, forming a part of this specification, wherein—

Figure 1 represents the outside covering of the bee-hive.

Figure 2 represents the interior frame-work, with the top and side covering removed.

Figure 3 represents the side covering removed from the bee-hive.

The letters used represent corresponding parts wherever they occur.

To enable others skilled in the art to make and use my invention, I will proceed to describe the same, and the manner in which it may be used.

A represents the bottom of the hive, which should be a smooth board, of sufficient size and thickness to support the frame-holder.

To the sills $a\ a$ are fastened, by means of screws or otherwise, in any common form, the frame-holders F F, which are placed at a sufficient distance from each other to receive the comb-frames $b\ b$.

It is better to make the frame-holders of cast-iron, although they may be made of wood or any suitable metallic substance, and at the top of the frame-holders I make notches, $n\ n\ n$, to receive the main beams of the comb-frames, and on the inside of the lower part I make studs $s\ s\ s$, with openings between them, to receive the comb-frames.

The comb-frames are made of wood, in the common form, with a main beam, $b\ b$, side pieces $p\ p$, and a cross-piece at the bottom, $o\ o$.

The side pieces $p\ p$ should be made so as to loosely fit in the spaces between the studs $s\ s$, for convenience in handling, but not so loose as to give them any side or swinging motion.

The outside cover or shell C is made so that there will be a place for ingress and egress for the bees at E and $f$, and the top covering D will be made so as to fit over the outside shell or cover C, and thus keep out the wind and rain, and rests upon the moulding $m$.

I thus construct a bee-hive in all respects firm and strong, and which can readily be taken apart for any purpose that may be desired, and the comb-frames can easily be removed, without injury to themselves or to the bees.

What I claim as my invention, and desire to secure by Letters Patent, is—

1. The frame-holders F F separately, and also in combination with the sills $a\ a$, substantially as and for the purposes described.

2. Also, the same parts, in combination with the comb-frames $c\ c$, substantially as described, and independent of and detached from the outside covering C D.

3. Also, the frame-holder F, constructed as described, in combination with the outer covering C and top D, as set forth.

T. R. ALLEN.

Witnesses:
 N. B. SMITH,
 C. W. SMITH.